Dec. 22, 1964  M. PLOKE  3,162,766
PHOTOELECTRIC RECEIVER WITH SUPPLEMENTARY IRIS DIAPHRAGM
Filed Jan. 23, 1961

3,162,766
PHOTOELECTRIC RECEIVER WITH SUPPLEMENTARY IRIS DIAPHRAGM
Martin Ploke, Preetz, Holstein, Germany, assignor to Zeiss Ikon Aktiengesellschaft, Stuttgart, Germany
Filed Jan. 23, 1961, Ser. No. 84,392
Claims priority, application Germany, Jan. 30, 1960, Z 7,788
12 Claims. (Cl. 250—229)

The invention relates to a photoelectric receiver provided with a supplementary iris diaphragm.

It has been proposed heretofore to employ in certain instances diaphragms with an adjustable aperture, i.e. so-called iris diaphragms, in connection with photoelectric exposure meters. Such diaphragms are used for controlling the size of the light passage aperture arranged in front of the photoelectric elements. However, an extensive use of such diaphragms has not taken place because the photoelectric receivers in general have the property that the produced photoelectric current is not only dependent upon the amount of the light which strikes the receivers, but is also dependent upon the size or area of the illuminated surface. As a consequence, the indication of the exposure meter is not proportional to the diaphragm area so that a special correction is required, which correction differs depending upon the particular photoelectric properties of the receiver.

It is an object of the present invention to avoid these disadvantages and at the same time to provide the optical system arranged in front of the photoelectric receiver with an axial length or thickness which is as short as possible.

In accordance with the present invention, a light diffusion body is arranged between the photoelectric receiver and the iris diaphragm. This light diffusion body has the form of a lens provided adjacent its axis with conically shaped constrictions of such a shape that parallel light rays passing through the lens illuminate the entire zone of the receiving face of the photoelectric receiver. At least one face of this lens is frosted or is provided with grooves or ridges in order to produce such a light diffusion action that the photoelectric receiving face is substantially uniformly illuminated independent of the adjusted size of the diaphragm aperture. In this manner the highest proportionality between the amount of light reaching the photoelectric receiver and the produced electrical conditions in the photoelectric receiver is obtained and at the same time the system arranged in front of the photoelectric receiver will have a very short axial length or thickness.

The effect of the light diffusion body is improved in practice, because most of the light which is not directed parallel enters the aperture of the iris diaphragm more or less in a diffused condition.

It is another object of the invention to make one of the two faces of the light diffusion body, namely preferably the face directed toward the incoming light, aspheric for the purpose of obtaining a stronger concentration of the incoming parallel beam of light, while the other face of the light dispersion body, which is directed away from the incoming light, is formed as a ring-shaped area. The aspheric surface of the light dispersion body is preferably formed as a Fresnel-type or stepped lens in order to obtain a further reduction in the axial length of the optical attachment arranged in front of the photoelectric receiver.

Still another object of the invention is to employ a light diffusion body consisting of two individual lenses. The refractive power of these two lenses, when added together, is approximately the same as when the light diffusion body would have been made of a single piece. When separating the light diffusion body in this manner, the iris diaphragm will be arranged between the two individual lenses. The refractive power and the diffusion action of the light diffusion body are selected and distributed over its cross section in such a manner that the annular zone illuminated by the light diffusion body has an outer diameter which is equal to .5 to .7 of the largest diaphragm diameter.

Still another object of the invention resides in a simplified production of the light diffusion body in that the lens action and the diffusion action is allocated to two preferably closely adjacent individual bodies so that one of the two bodies solely deflects the rays, while the other body solely effects a diffusion of the rays. The diffusion body may consist of a foil of plastic material provided with embedded white particles.

For certain fields of application of a photoelectric receiver having the mentioned characteristics the employment of two iris diaphragms is advisable, because in such a case one diaphragm may be used for controlling a diaphragm mechanism for a photographic camera, while the second diaphragm may be used for considering other exposure factors.

Another object of the invention is to combine such a double diaphragm arrangement with light diffusion bodies in such a manner that the additional adjustable diaphragm is arranged in a surface which is uniformly illuminated by one of the two light diffusion bodies, while the second light diffusion body may be combined with the additional adjustable diaphragm for uniformly illuminating a photoelectric receiver. In addition to the uniform illumination obtained for the diaphragm aperture of the additional adjustable diaphragm and for the photoelectric receiving surface, such a diaphragm system makes the field lens heretofore required no longer necessary.

In order to also make use of light rays which enter the arrangement at a very large inclination with respect to the optical axis, the present invention provides that the inner surface of a hollow cylindrical wall extending between the diffusion body and the photoelectric receiver has a reflecting surface which reflects the strongly inclined rays passing through the light diffusion body toward the photoelectric receiver.

It is still another object of the present invention to produce the light diffusion body by pressing or by die casting from a plastic material, because these light diffusion bodies do not require a high quality optical formation, the more so, since the surfaces of these light diffusion bodies can be readily protected against mechanical influences.

With the foregoing and other objects in view, the invention will now be described with reference to the accompanying drawings which disclose a number of different embodiments of the invention.

Figure 1:
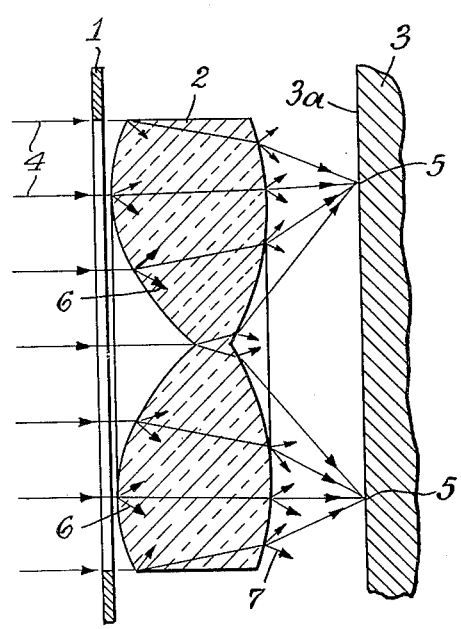
FIG. 1 illustrates diagrammatically an axial section of the light receiving portion of a photoelectric exposure meter.

Referring to FIG. 1, the light diffusion body in the form of a lens 2 is arranged between an iris diaphragm 1 and a photoelectric receiver 3. The lens 2 is constructed in such a manner that a light beam 4 which passes through the lens 2 in a direction parallel to the optical axis of this lens, is concentrated in circular or an annular zone upon the receiving surface 3a of the photoelectric receiver 3. This annular zone extends about the circular line 5. The faces of the lens 2 are frosted so that the incoming rays as indicated at 6 and the outgoing rays as indicated at 7 are diffused. This results in the fact that the surface of the receiver 3 within the circular line 5 is approximately uniformly illuminated independently of the adjusted size of the aperture of the iris diaphragm.

Figure 2:
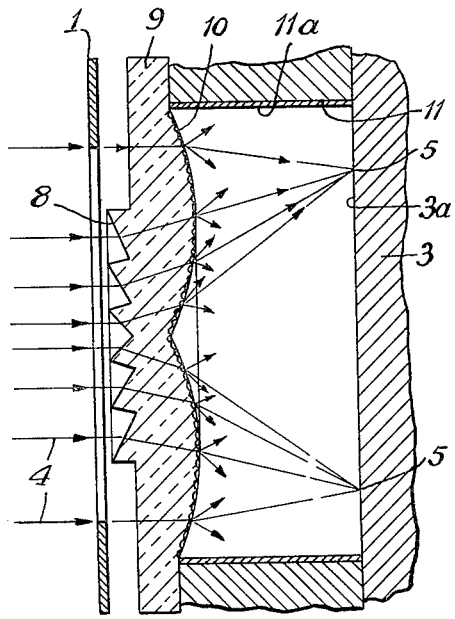
FIG. 2 illustrates a modified arrangement of this light receiving portion.

FIG. 2 illustrates a modified arrangement in which the lens 2 of FIG. 1 is replaced by a lens 9. The lens 9 is constructed on its face 8, which is directed toward the incoming light rays, in the form of a Fresnel or stepped lens, while the face 10 of the lens 9, which is directed away from the incoming light rays, is constructed in the form of an area having an annular cambered portion and the like. Between the lens 9 and the photoelectric receiver 3 is arranged a ring-shaped member 11a the inner cylindrical wall 11 of which is made reflective so that also light rays which pass through the lens at a greater inclination with respect to the optical axis are reflected toward the photoelectric receiving surface 3.

Figure 3:
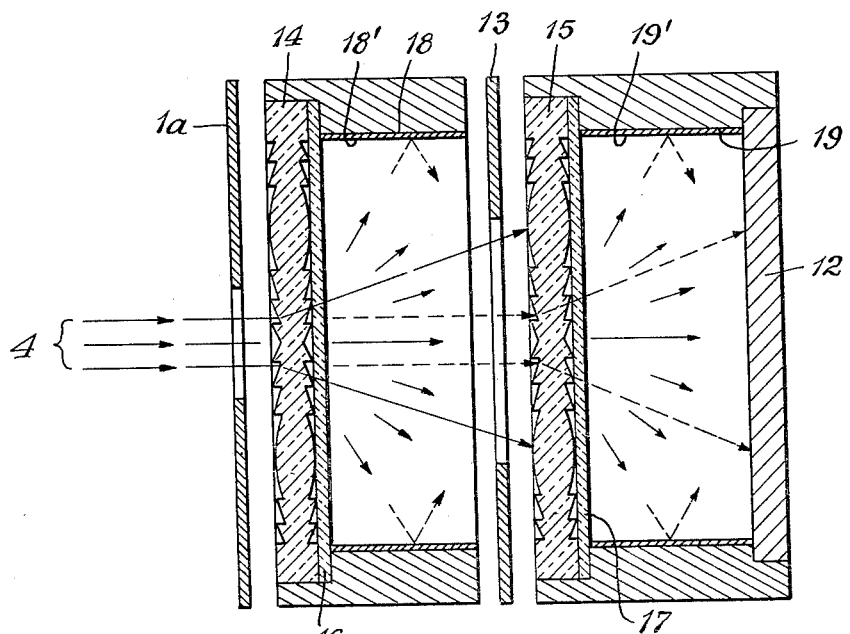
FIG. 3 illustrates still another modified arrangement of the light receiving portion of a photoelectric exposure meter in accordance with the present invention.

FIG. 3 illustrates still another embodiment of the invention. In this FIG. 3 there are provided two closely and axially spaced iris diaphragms 1a and 13 and each of these diaphragms has arranged in rear thereof a stepped lens 14 and 15, resp. Each of these lenses have in turn arranged at their rear faces a light diffusion disc 16 and 17, respectively, so that the lens action and the diffusion action may be allocated to two directly adjacently arranged individual bodies. In this embodiment there are also provided between the lens 14 and the centrally arranged diaphragm 13 on one hand and between the lens 15 and the photoelectric receiver 12 on the other hand the ring-shaped members 18' and 19', respectively, the inner cylindrical walls 18 and 19, respectively, of which are provided with a reflective surface. In this manner the diaphragm 1a may for instance be coupled with a diaphragm mechanism of a photographic camera, while the diaphragm 13 may be used for associating therewith additional exposure factors.

What I claim is:

1. The combination with a photoelectric receiver, of a supplementary iris diaphragm, and a light diffusion means arranged between said photoelectric receiver and said iris diaphragm, said light diffusion means comprising a lens which is provided adjacent its axis with concentrically arranged conical constrictions which cause light beams passing parallel to the axis through said lens to illuminate the entire surface of said receiver within a ring-shaped area on said photoelectric receiver and the light rays in the outer zone of the iris diaphragm to be deflected toward the photo-electric receiver in the direction of the optical axis, the area within the ring-shaped area being uniformly illuminated by a pattern of ring-shaped illuminated zones of small and large diameters on different radii.

2. The combination with a photoelectric receiver, of a supplementary iris diaphragm, and a light diffusion means arranged between said photoelectric receiver and said iris diaphragm, said light diffusion means comprising a lens which is provided adjacent its axis with concentrically arranged conical constrictions which cause light beams passing parallel to the axis through said lens to illuminate the entire surface of said receiver within a ring-shaped area on said photoelectric receiver and the light beams in the outer zone of the iris diaphram to be deflected toward the photo-electric receiver in the direction of the optical axis, at least one of said faces of said lens being frosted to produce such a light diffusion that the surface of said photoelectric receiver within said area will be illuminated by a series of circular areas of different diameters on various radii and will be substantially uniformly illuminated regardless of the size of the aperture to which said iris diaphragm has been adjusted.

3. The combination with a photoelectric receiver, of a supplementary iris diaphragm, and a light diffusion means arranged between said photoelectric receiver and said iris diaphragm, said light diffusion means comprising a lens which is provided adjacent its axis with concentrically arranged conical constrictions which cause light beams passing parallel to the axis through said lens to illuminate the entire surface of said receiver within a ring-shaped area on said photoelectric receiver and the light beams in the outer zone of the iris diaphragm to be deflected toward the photo-electric receiver in the direction of the optical axis, at least one of said faces of said lens being aspheric, while the other face has the shape of an annular cambered portion, said photoelectric receiver within said ring-shaped area being illuminated by a pattern of circular zones of small and large diameters on various radii.

4. The combination with a photoelectric receiver, of a supplementary iris diaphragm, and a light diffusion means arranged between said photoelectric receiver and said iris diaphragm, said light diffusion means comprising two closely spaced individual lenses mounted on opposite sides of said iris diaphragm, the added characteristics of which are equal to a one piece light diffusion body, and an iris diaphragm arranged between said two individual lenses said diffusion means being adapted to illuminate a marginal ring-shaped area of said receiver with the area therein illuminated by a series of illuminated zones of large and small diameters on different radii.

5. The combination with a photoelectric receiver, of a supplementary iris diaphragm, and a light diffusion means arranged between said photoelectric receiver and said iris diaphragm, said light diffusion means having such a refractive index and such a diffusion action distributed over its cross sectional area that an area within an annular zone on said photoelectric receiver will be illuminated by light passing through said light diffusion body of a size having an outer diameter which is equal to .5 to .7 of the largest diaphragm diameter and the light impinging near the outer zone of said iris diaphragm will be deflected toward the optical axis to form a series of large and small illuminated circular areas on different radii.

6. The combination with a photoelectric receiver, of a supplementary iris diaphragm, and a light diffusion means arranged between said photoelectric receiver and said iris diaphragm, said light diffusion means comprising two axially spaced stepped lenses, a diaphragm in front of each said lenses and a light diffusion disc positioned directly adjacent one face of each said lenses, said diffusion means being adapted to illuminate a marginal ring-shaped area of said receiver with the area therein illuminated by a series of illuminated zones of large and small diameters on different radii.

7. The combination with a photoelectric receiver, of a supplementary iris diaphragm, and a light diffusion means arranged between said photoelectric receiver and said iris diaphragm, said light diffusion means comprising two axially spaced stepped lenses, a diaphragm in front of each said lenses, and a plastic foil having white particles embedded therein positioned directly adjacent the rear face of each said lenses, said diffusion means being adapted to illuminate a marginal ring-shaped area of said receiver with the area therein illuminated by a series of intersecting circular illuminated zones of large and small diameters on different radii.

8. The combination with a photoelectric receiver, of a supplementary iris diaphragm, and a light diffusion means arranged between said photoelectric receiver and said iris diaphragm, said light diffusion means comprising two axialy spaced light diffusion bodies, and an additional diaphragm arranged between said two light diffusion bodies, said diffusion means being adapted to illuminate a marginal ring-shaped area of said receiver with the area therein illuminated by a series of intersecting circular illuminated zones of large and small diameters on different radii.

9. The combination with a photoelectric receiver, of a supplementary iris diaphragm, and a light diffusion means arranged between said photoelectric receiver and said iris diaphragm, said light diffusion means comprising a lens which is provided adjacent its axis with concentrically arranged conical constrictions which cause light beams passing parallel to the axis through said lens to illuminate the receiver within a ring-shaped area on said photoelectric receiver, and a hollow cylindrical wall extending between said light diffusion means and said photoelectric receiver and provided with a reflective surface for reflecting diffused light rays passing through said light diffusion means toward said photoelectric receiver, said diffusion means being adapted to illuminate a marginal ring-shaped area of said receiver with the area therein illuminated by a series of intersecting circular illuminated zones of large and small diameters on different radii.

10. The combination with a photoelectric receiver of a supplementary iris diaphragm, and a light diffusion means arranged between said photoelectric receiver and said iris diaphragm, said light diffusion means comprising a lens which is provided adjacent its axis with concentrically arranged conical constrictions which cause light beams passing parallel to the axis through said lens to illuminate the receiver within a ring-shaped area on said photoelectric receiver and the rays passing through said lens at an angle to the axis to uniformly illuminate the receiver in a pattern of circular areas on different radii, said light diffusion means consisting of pressed plastic material, the light beams impinging in the outer zone of the iris diaphragm being deflected toward the optical axis of said receiver.

11. The combination with a photoelectric receiver, of a supplementary iris diaphragm, and a light diffusion means arranged between said photoelectric receiver and said iris diaphragm, said light diffusion means comprising a lens which is provided adjacent its axis with concentrically arranged conical constrictions which cause light beams passing parallel to the axis through said lens to illuminate the receiver within a ring-shaped area on said photoelectric receiver, said light diffusion means being formed of die-cast plastic material, the light beams impinging in the outer zone of the iris diaphragm being deflected toward the optical axis of said receiver, the rays passing through said light diffusion means at an angle to the axis forming a pattern of large and small circular zones within said ring-shaped area with the rings and circular areas intersecting and being on different radii.

12. A photo-electric receiver, comprising a light sensitive cell, an adjustable iris diaphragm disposed in front of the cell in closely spaced relation therewith, a light diffusing element mounted between said diaphragm and said cell, said light diffusing element being in the form of a lens of a shape having a reduced portion which extends conically adjacent the axis of said lens to form annular cambered portions for deflecting light beams which impinge upon said lens and extend parallel to the axis so that said light beams will be divergent if they impinge said lens at locations close to the axis and will be convergent if they impinge said lens in the outer random zone, said converging light beams illuminating an annular zone of the receiver cell at least approximately uniformly regardless of the selected size of the diaphragm, whereby the surface area of said lens is given an increased diffusion effect, said lens forming large and small circular zones of different diameters within a marginal ring-shaped area on various radii means of a matte finish and the provision of channels on said surface.

References Cited by the Examiner
UNITED STATES PATENTS

| | | | |
|---|---|---|---|
| 1,627,892 | 5/27 | Frederick | 88—57 |
| 1,990,396 | 2/35 | Ballard | 88—23 X |
| 2,182,987 | 12/39 | Hopkins | 250—239 X |
| 2,259,395 | 10/41 | Sachtleben | 88—57 |
| 2,547,416 | 4/51 | Skellett | 88—57 |
| 2,554,584 | 5/51 | Metz | 88—57 |
| 2,612,817 | 10/52 | Willcox | 250—237 X |
| 2,769,365 | 11/56 | Loeschke et al. | 250—237 X |
| 2,831,394 | 4/58 | Heenan et al. | 88—57 |
| 2,949,819 | 8/60 | Smith | 88—57 |
| 2,961,925 | 11/60 | Clark et al. | 88—57 |
| 2,964,636 | 12/60 | Cary | 250—239 X |
| 3,035,489 | 5/62 | Simons | 88—57 |

RALPH G. NILSON, *Primary Examiner.*

EMIL G. ANDERSON, ARCHIE R. BORCHELT,
*Examiners.*